United States Patent [19]
Ramos, Jr.

[11] Patent Number: 5,232,645
[45] Date of Patent: Aug. 3, 1993

[54] PROCESS FOR MAKING COILED BRAKE TUBING

[76] Inventor: Phillip M. Ramos, Jr., 1023 S. Taylor Ct., Anaheim, Calif. 92808

[21] Appl. No.: 936,514

[22] Filed: Aug. 28, 1992

Related U.S. Application Data
[62] Division of Ser. No. 816,244, Jan. 3, 1992.

[51] Int. Cl.$^5$ .............................................. B29C 53/32
[52] U.S. Cl. ..................... 264/103; 138/125; 264/173; 264/174; 264/209.3; 264/230; 264/281; 264/339
[58] Field of Search ............... 264/281, 339, 103, 173, 264/174, 230, 209.3; 425/133.1; 138/125

[56] References Cited
U.S. PATENT DOCUMENTS
| | | | |
|---|---|---|---|
| 3,245,431 | 4/1966 | Coe | 138/125 |
| 3,540,486 | 11/1970 | Flounders | 138/125 |
| 3,977,440 | 8/1976 | Phillippi | 138/125 |
| 4,009,734 | 3/1977 | Sullivan | 138/125 |
| 4,196,464 | 4/1980 | Russell | 264/173 |
| 5,024,468 | 6/1991 | Burge | 285/308 |

FOREIGN PATENT DOCUMENTS
| | | | |
|---|---|---|---|
| 2705564 | 8/1977 | Fed. Rep. of Germany | 264/281 |
| 2820465 | 11/1978 | Fed. Rep. of Germany | 138/125 |
| 1422936 | 1/1976 | United Kingdom | 138/125 |

Primary Examiner—Jeffery Thurlow

[57] ABSTRACT

Process for making coiled brake Tubing for truck/trailer rigs formed of a blend of polyolefin materials.

3 Claims, 3 Drawing Sheets

PROCESS FOR MAKING COILED BRAKE TUBING

This application is a division of co-pending application, Ser. No. 07/816,244, filed Jan. 3, 1992.

BACKGROUND OF THE INVENTION

It is standard practice in present day truck/trailer rigs for the trailer to be equipped with pneumatic operated emergency brakes as well as usual service air brakes. Pressurized air is supplied from the truck to the trailer and is introduced to the emergency brake and service brake system of the trailer. The emergency brake is released only so long as constant pressurized air is supplied to the brake. Pressurized air is also supplied to the service air brakes of the trailer upon application of the truck brake pedals by the truck driver.

It is usual in the art to supply the pressurized air for the emergency brakes of the trailer, and pressurized air for the service air brakes, through separate Nylon coiled Tubing which are intercoupled between connectors on the truck and on the trailer.

A major problem with the prior art nylon coiled tubing is caused by the excessive linear length of tubing required (prior to coiling) to accomplish the desired working length of the assembly. This extra linear length increases the distance of which pressured air must travel to activate the service braking systems resulting in a time delay problem commonly known in the industry as "brake lag". Brake lag (slower trailer brake reaction) is one of the factors contributing to the common "jack knife" accident. Excessive length of tubing is required in the prior art product due to the hardness of the nylon material. Another problem of excessive length is excessive sagging which can cause the tubing to catch on other parts of the truck or trailer.

Another major problem encountered with the prior art Nylon coiled Tubing is that of kinking damage. Coiled brake Tubing are handled frequently and the Nylon Tubing can easily be permanently damaged by kinking during handling or by entanglement with vehicle parts. A kink in a Nylon coiled Tubing remains permanent but not conspicuous. This permanent kinking damage is dangerous since it causes constriction of the Tubing and impedes and even cuts off the flow of pressurized air through the Tubing when the coil is extended (as in normal turning operations).

An object of the present invention is to provide a process for making a safer coiled air Tubing for the purposes described above which can help prevent the too common jack knife accident, and which is constructed of a non-kinking material, and which is capable of an extended trouble free life as compared with the prior art Tubing of the same general type.

The improved coiled air Tubing produced by the process of the invention also have an extended temperature range to −70° F. as compared with the prior art tubes, to obviate cracking in freezing temperatures, and to prevent separation from fittings due to cold temperature shrinkage.

In addition the improved coiled air tubes produced by the process of the invention are softer than the prior art tubes and has improved coiled memory characteristics to prevent excessive pull pressure on the connectors, to increase wear life of the Tubing, and also to eliminate sagging of the coiled Tubing so as to preclude any tendency of the Tubing to catch on other parts of the truck or trailer.

The coiled air Tubing produced by the process of the invention may have a greater wall thickness then the prior art Tubing for maximum reliability in all environments, and to permit lesser linear length prior to coiling per assembly for faster brake reaction and less brake lag.

DETAILED DESCRIPTION OF THE ILLUSTRATED EMBODIMENT

Figure 1:
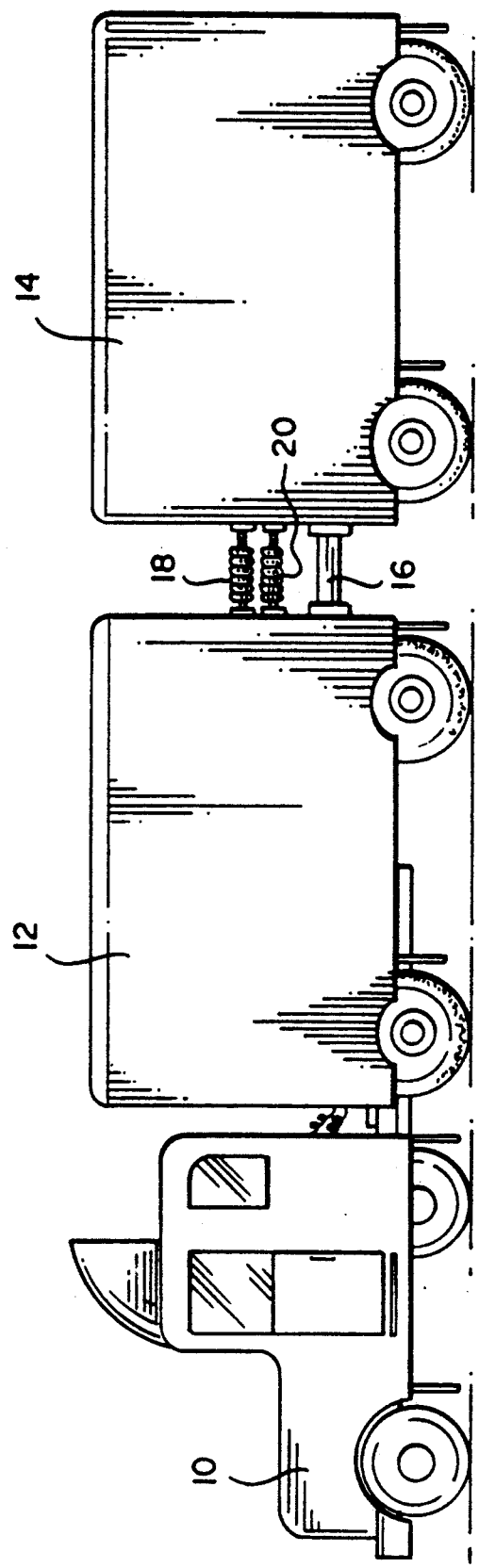
FIG. 1 is a perspective view of a typical truck-tractor, towing two trailers which shows typical coiled air tubes intercoupled truck-trailer to trailer and trailer to trailer.

As stated above, FIG. 1 represents a typical truck-tractor 10, a single-trailer 12, and a double-trailer 14. Single-trailer 12 is coupled to double-trailer 14 through a typical coupling 16. A pair of coiled air tubes 18 and 20 are connected between appropriate connectors on the tractor 10, single-trailer 12, and double-trailer 14.

The coiled air Tubing 18, for example, supplies pressurized air to the emergency brakes of the trailers 12 and 14. As mentioned above, the emergency brakes are spring actuated, and are held in a standby position only so long as pressurized air is supplied to the emergency brake system through the coiled air Tubing 18. The coiled air Tubing 20, on the other hand, supplies pressurized air to the service air brakes of the trailers, under the control of brake pedals in truck-tractor 10.

Figure 2:
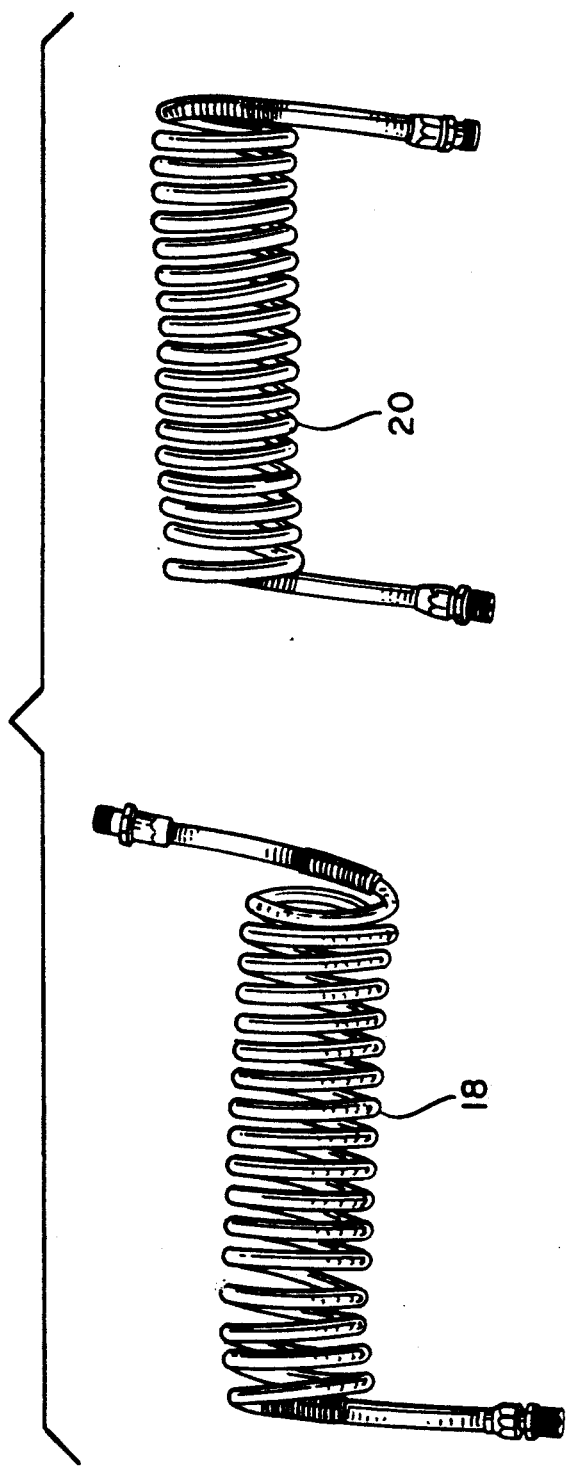
FIG. 2 is a perspective representation of a pair of air tubes, such as shown in FIG. 1, to be intercoupled tractor to trailer and trailer to trailer.

The coiled air tubes 18 and 20 are shown in perspective in FIG. 2, and these air tubes are constructed in accordance with the concepts of the present invention. Specifically, the air tubes 18 and 20 are each formed by blending compatible polyolefin materials. From both economical and performance considerations, the preferred blend consists of 20% ethylene vinyl-acetate copolymer, 60% linear low density polyethylene, 7% polypropylene, 8% thermoplastic rubber (TPR), 2% color concentrate, and 2% ultra-violet inhibitors. These materials are blended by a 24:1 L/D ratio extruder into a homogeneous compound. The suggested extrusion temperature conditions (°F.) are: Feed: 300–325, Zone 2: 325–375, Zone 3: 375–400, Zone 4-X: 425–475, Adapter: 425–475, Die: 425–475, Melt Temperature: 425–475.

Other blended or pure materials may be used to accomplish the desired performance, and such materials may be selected from a class consisting of polyurethane, polyester elastomer, ethylene-ethyl acrylate copolymer, linear high and low density polyethylene, ethylene vinyl acetate, thermoplastic rubber, and polyvinyl chloride.

The desired characteristics which were realized in the selected materials are: +150 for or higher to °F. −70 ° F. temperature operating range, high resilience (anti-kinking feature), strong flexible strength, high chemical resistance, high oil resistance, high ozone resistance, high ultra violet resistance, strong burst strength, and compliance with the U.S. Department of Transportation Code of Federal Regulations 49 - Federal Motor Vehicle Safety Standard 571.106 of the National Highway Safety Administration, and Section 393.45 of the Federal Motor Carrier Safety Regulations of the Federal Highway Administration.

Figure 3:
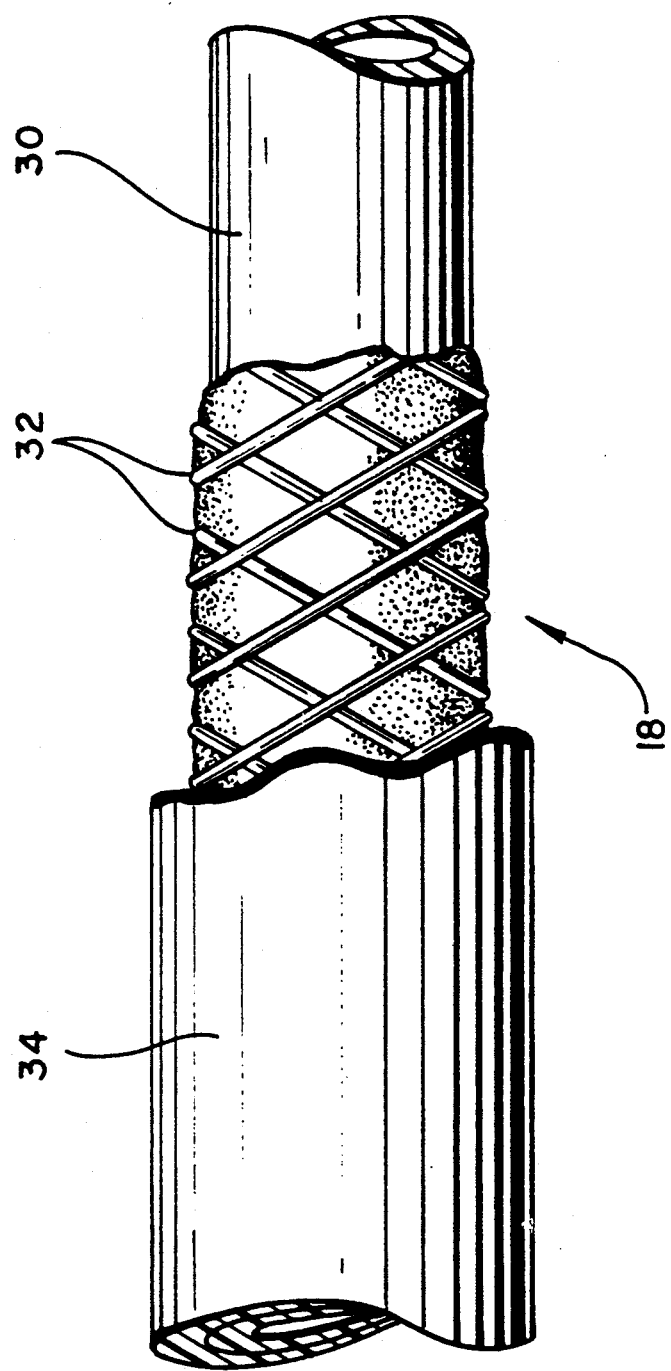
FIG. 3 is a representation of the various layers which make up the tubes of FIGS. 1 and 2.

The first step in the construction of the coiled Tubing of the invention is the formation of a core extrusion of the blended materials to form a continuous tubing 30 (FIG. 3) with an inside diameter of 0.375", an outside diameter of 0.525", and a wall thickness of 0.075". The core is reinforced with a polyester braid 32 or equivalent at 8 picks per inch (the prior art Nylon coiled tubing has braids at 4 picks per inch). The braided core is jacketed (34) with the blended materials with light resistance additives. The jacket 34 outside diameter is 0.625". The combined wall thickness of the core 30 and jacket 34 is 0.125". The jacket is bonded to the core through the interstices of the braid 32.

The coiling of the Tubing is accomplished by winding the tubing around a 2" mandrel and cutting it to a pre-determined length with two straight ends. The pre-determined length for 12 feet working length is not more than 15 feet 6 inches and not less than 12 feet. The pre-determined length of 15 feet working length is not more than 18 feet 6 inches and not less than 15 feet. Other working lengths may be designed for special applications. The mandrel with the wrapped Tubing is then heated to set a coil memory. After cooling, the coiled Tubing is then removed from the mandrel and reverse wound in the opposite direction to improve the coil memory.

As stated above the prior art coiled air Tubing of the same general type as the present invention is made of polyamide (Nylon). Whereas, Nylon is extremely tough and resistant to heat abrasion, and cut through, it has poor flexing strength, and is so rigid that the reversing process described above is impractical with Nylon tubing. Also, the low temperature limit of Nylon tubing is dependent upon the wall thickness and the diameter of the construction. As both of these parameters increases, the susceptibleness to cracking by flexing at low temperature also increases.

Additionally, since Nylon has such poor flexing characteristics, the Nylon coiled tubing requires more linear footage to accomplish the same coil working length as the tubing of the present invention. This added footage (coil loops) helps compensate for the flexing limitations of the Nylon coiled tubing, but is also contributes to a problem in the trucking industry called "brake lag". The added footage increases the distance which air must travel to activate the brakes. The typical nylon assembly pre-determined length for 12 feet working lengths is 17 to 18 feet, and 21 to 23 feet for 15 feet working length. For this reason some fleets prefer straight tube assemblies over coiled tube assemblies.

The wall thickness of the coiled Tubing of the invention is greater than the prior art Nylon coiled tubing which follows the dimension of SAE J844d. Again, due to the poor flexibility of Nylon, a greater wall thickness is not feasible since it inhibits the performance of Nylon tubing by making it too stiff.

The standard size Nylon prior art coiled tubing in the trucking industry is ⅜" (0.375") inside diameter and a ½" (0.500") outside diameter to provide a 0.062" (+ or −0.004") wall thickness. The coiled tubing of the present invention in a preferred embodiment has a ⅜" (0.375") inside diameter and a ⅝" (0.625") outside diameter to provide a 0.125" (+ or −0.005") wall thickness. The thicker wall of the tubing produced by the process of the invention improves the flexible strength and durability over the prior art Nylon coiled tubing.

To sum up, the coiled Tubing produced by the process of the present invention, addresses and corrects the major problems in the trucking industry encountered with prior art Nylon coiled TUBING, which becomes permanently damaged when kinked, which has a tendency to crack in cold weather, to break at the fittings, and to become entangled with vehicle parts as a result of excessive sagging and which give rise to brake lag. These problems are all serious safety concerns and can be a contributing factor to traffic accidents involving heavy duty trucks and trailers.

Specifically, the improved coiled Tubing produced by the process of the invention offers the heavy duty trucking industry a safer product, a more durable product, and cost savings for the industry due to lesser replacement costs.

It is to be understood that the various dimensions set forth above with respect to a preferred embodiment of the invention are for descriptive purposes only, and are not intended to limit the invention in any way.

It is also to be understood that although a particular embodiment of the invention has been shown and described, modifications may be made, and it is intended in the claims to cover all modifications which come within the true spirit and scope of the invention.

I claim:

1. A process for producing a coiled brake tubing which comprises: forming a tubular core extrusion of a blend of polyolefin materials, reinforcing the core with a braid of a selected material, and forming a jacket of said blend of polyolefin materials over said core and bonded to said core through the interstices of said braid.

2. The process defined in claim 1, in which comprises the step of wrapping the tubing around a mandrel, and exposing the mandrel and wrapped tubing to elevated temperatures for a time sufficient to set the coil memory.

3. The process defined in claim 2, and which comprises the subsequent step of cooling the wrapped tubing to ambient temperature, removing the tubing from the mandrel, and wrapping the tubing around the mandrel in the reverse direction to enhance the setting of the coiled memory.

* * * * *